US008207815B2

(12) United States Patent
Newman et al.

(10) Patent No.: US 8,207,815 B2
(45) Date of Patent: Jun. 26, 2012

(54) FACILITY ACCESS INTEGRATED WITH OTHER SECURITY SYSTEMS

(75) Inventors: Kurt D. Newman, Matthews, NC (US); Debashis Ghosh, Charlotte, NC (US); Michael James O'Hagan, Charlotte, NC (US); David Joa, Pacifica, CA (US); Timothy J. Bendel, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 651 days.

(21) Appl. No.: 12/339,902

(22) Filed: Dec. 19, 2008

(65) Prior Publication Data

US 2010/0156591 A1 Jun. 24, 2010

(51) Int. Cl.
*G05B 19/00* (2006.01)

(52) U.S. Cl. ............. 340/5.2; 340/5.82; 340/541; 726/2

(58) Field of Classification Search ................... 340/5.2, 340/541, 5.7, 5.82; 726/2; 713/186
See application file for complete search history.

(56) References Cited

U.S. PATENT DOCUMENTS

| | | | | |
|---|---|---|---|---|
| 5,204,663 | A * | 4/1993 | Lee | 340/5.28 |
| 5,325,084 | A * | 6/1994 | Timm et al. | 340/541 |
| 5,629,981 | A * | 5/1997 | Nerlikar | 713/168 |
| 5,673,034 | A * | 9/1997 | Saliga | 340/5.26 |
| 6,111,502 | A * | 8/2000 | Lenglart et al. | 340/541 |
| 6,323,761 | B1 | 11/2001 | Son | |
| 6,374,296 | B1 * | 4/2002 | Lim et al. | 709/225 |
| 7,752,652 | B2 * | 7/2010 | Prokupets et al. | 726/2 |
| 7,847,675 | B1 * | 12/2010 | Thyen et al. | 340/5.2 |
| 7,890,483 | B1 * | 2/2011 | Aaron et al. | 707/705 |
| 2003/0171930 | A1 * | 9/2003 | Junqua | 704/275 |
| 2004/0036574 | A1 * | 2/2004 | Bostrom | 340/5.82 |
| 2007/0193834 | A1 * | 8/2007 | Pai et al. | 186/3 |
| 2007/0198850 | A1 * | 8/2007 | Martin et al. | 713/186 |
| 2009/0164680 | A1 * | 6/2009 | Stobbe et al. | 710/110 |

* cited by examiner

*Primary Examiner* — Eric M Blount
(74) *Attorney, Agent, or Firm* — Banner & Witcoff, Ltd.; Michael A. Springs

(57) ABSTRACT

Systems and methods for integrating facility access with other security systems are described. An individual seeking access authorization to a facility may be identified with a biometric parameter such as an iris scan. If authorized, the system may allow entry by disabling the alarm system, and a time period for access may be determined based on one or more characteristics associated with the individual. These characteristics may include the functional role of the individual at the facility and/or the location of the facility itself. Moreover, this facility access authorization system may be integrated with a network access authorization system associated with the facility so that when an individual gains access to the facility for a specific time period, the system is also able to determine how long the individual may access its network resources.

38 Claims, 8 Drawing Sheets

FACILITY ACCESS INTEGRATED WITH OTHER SECURITY SYSTEMS

BACKGROUND

Ensuring that adequate security measures are present for both access to areas and use of equipment or items in those areas is one consideration for many entities providing products and services. Proper security systems reduce the amount of illegal activity (e.g., fraud, theft, etc.) that occur against such an entity.

Different types of security systems exist for such entities. Access authorization to the entity is a first level of security that an entity may include in a system. With implementation of this level of security, access to more secure areas within the entity or access to certain products and services (e.g., certain computing capabilities) provided within the entity may be authorized.

However, as a result of these security systems, false alarms (e.g., alarms sounding even when authorized individuals access secured areas) are expensive in terms of money spent responding to the alarm and time lost in productivity for the entity. False alarms are caused by many factors, including human error (individuals forgetting to turn off the alarm system) and a malfunction in the system itself. Therefore, there is a desire for such entities to reduce the rate of occurrence of false alarms.

Traditionally, basic facility access systems have included keys and access cards where an individual swipes a card reader for access to an entity. Other types of facility access systems utilizing biometric recognition also exist. Internal access authorization after initial entry can also include any or all of these options.

FIG. 3*a* illustrates a conventional method for authorizing access into a facility. At step 301, an entity has an alarm system that may be activated. At step 303, an individual who seeks entry into the facility represented by the entity may present access credentials. These credentials traditionally have included keys and access cards. The individual may be identified in step 305, and the system may make a decision as to whether the credentials are valid in step 307. If they are valid, then the security system may deactivate and access may be granted in step 311. Meanwhile, if the credentials are invalid, then access may be denied in step 309. However, such a conventional method is prone to false alarms.

FIG. 3*b* illustrates an example false alarm system where the individual is authorized to enter but forgets to deactivate when entering. At step 301*b*, an entity has an alarm system that may be activated. At step 303*b*, an individual who seeks entry into the facility represented by the entity may present access credentials. The system then may decide whether the individual presents valid access credentials in step 305*b*. If she does not, then access may be denied in step 307*b*. If she does, the individual is permitted entry into the entity in step 309*b*. Once the individual enters, she must remember to deactivate the alarm system in step 311*b*. If she does, then the alarm system deactivates in step 315*b*, but if she does not, then a false alarm is generated in step 313*b*.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the present disclosure are directed to a method and system for a new facility security system that integrates access authorization with alarm systems and internal access to products and services.

In providing security access to a facility, aspects of the present disclosure recognize and use various identification protocols, some of which may be proprietary (traditional card, touch less using radio frequency identification (RFID), and biometric identification).

Another aspect of the present disclosure is directed to methods and systems for biometrically identifying an individual providing access to a facility and internal access to products and services within the facility without a need for the individual to input authentication data into a system/device.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
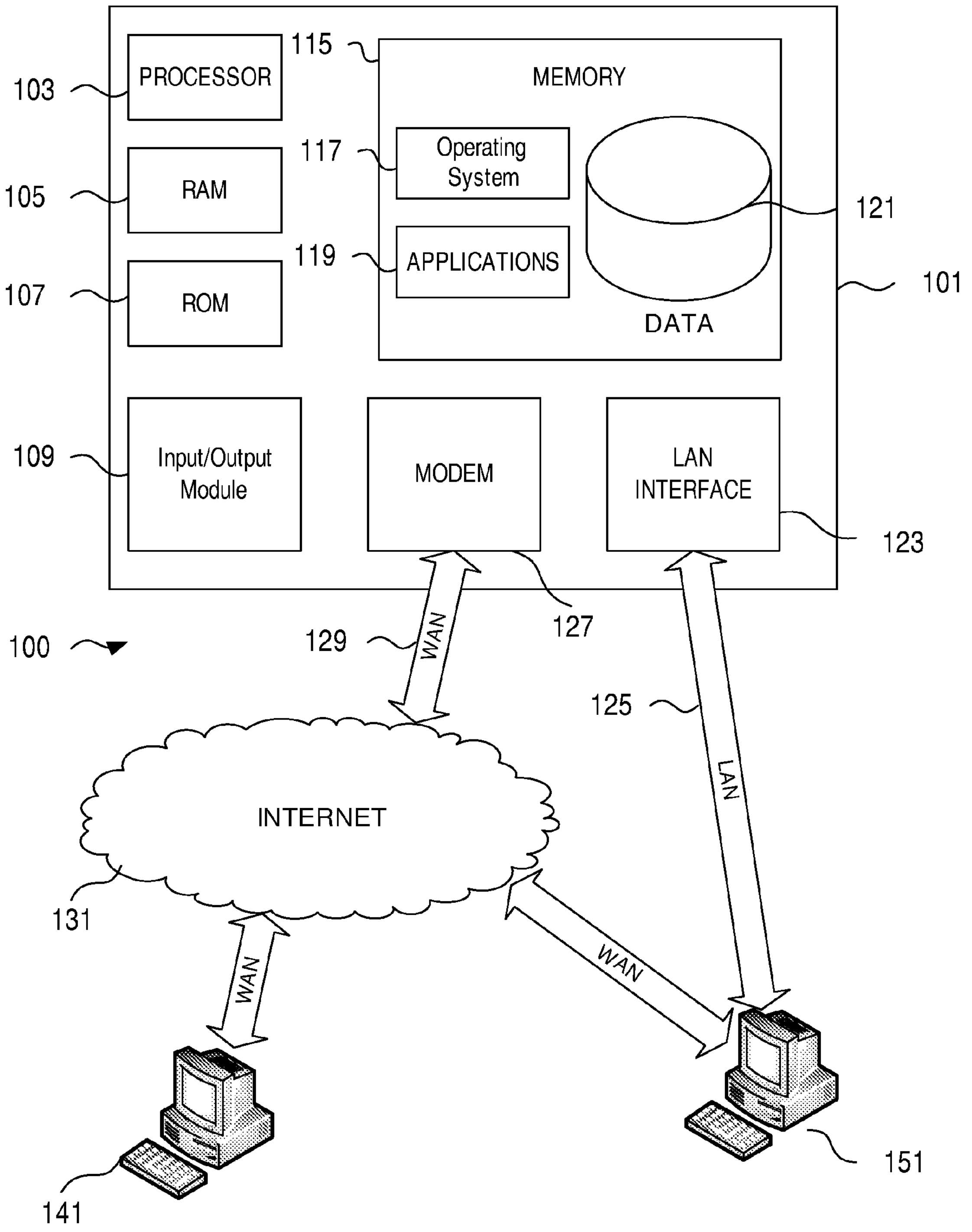
FIG. 1 illustrates a schematic diagram of a general-purpose digital computing environment in which certain aspects of the present disclosure may be implemented.

FIG. 1 illustrates a block diagram of a generic computing device 101 (e.g., a computer server) that may be used according to an illustrative embodiment of the disclosure. The computer server 101 may have a processor 103 for controlling overall operation of the server and its associated components, including RAM 105, ROM 107, input/output module 109, and memory 115.

I/O 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of characteristics associated with individuals, allowing interoperability between different elements of the business residing at different physical locations.

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 119 used by the server 101 according to an illustrative embodiment of the disclosure may include computer executable instructions for invoking functionality related to providing access authorization for facilities and networks.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

Figure 2:
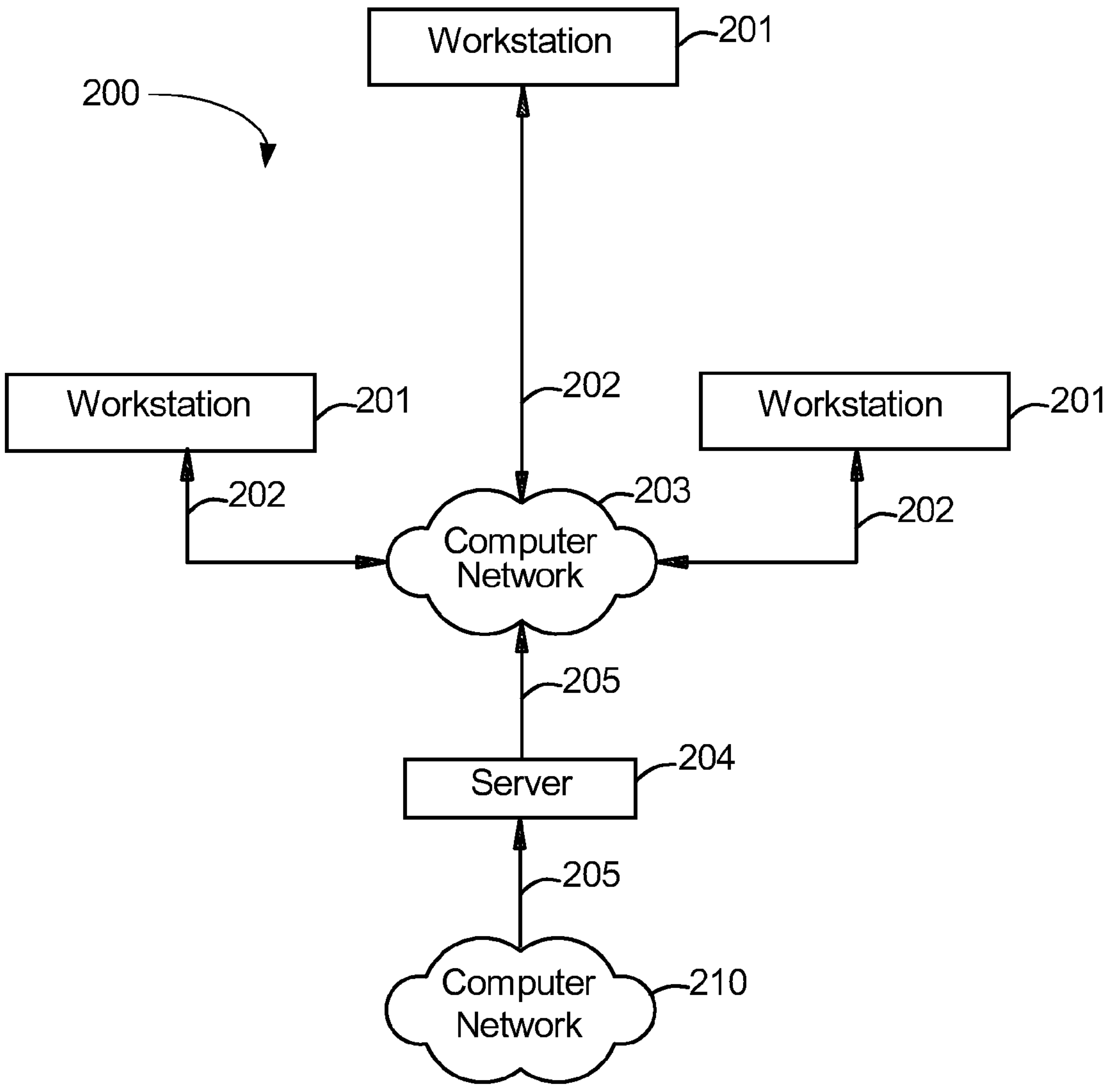
FIG. 2 is an illustrative block diagram of workstations and servers that may be used to implement the processes and functions of certain embodiments of the present disclosure.
Figure 3A:
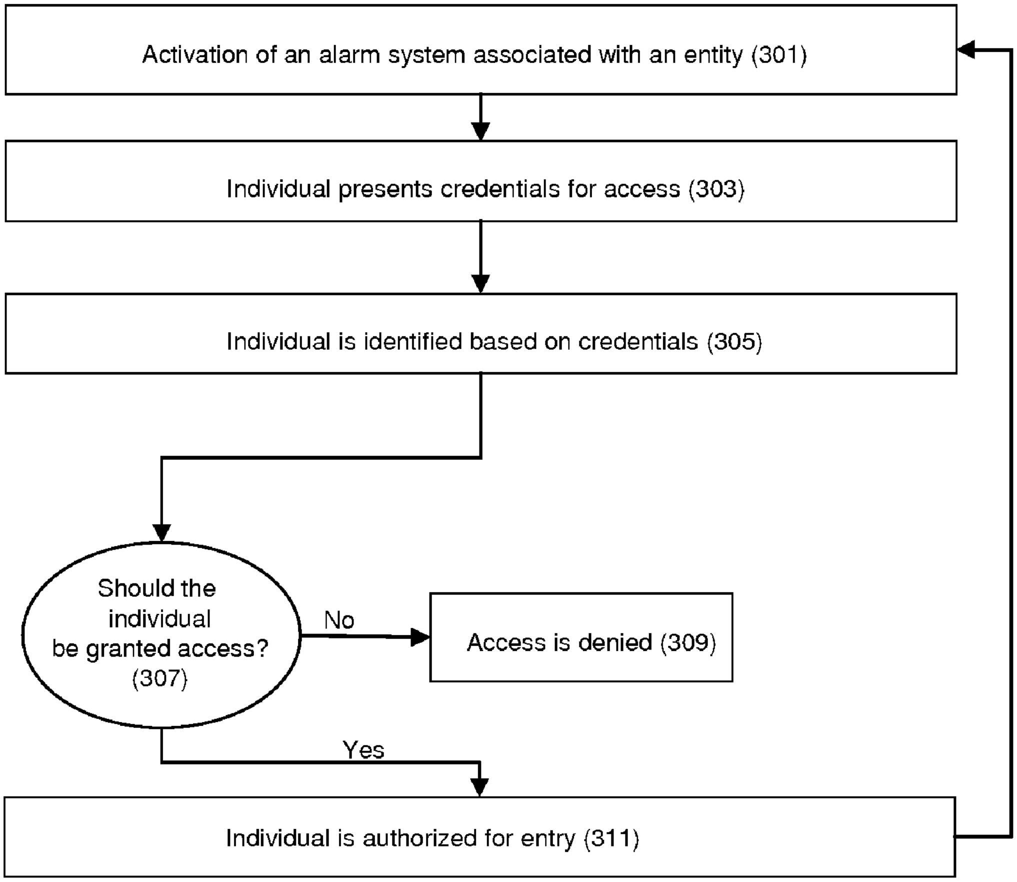
FIGURE 3A (PRIOR ART)
FIG. 3*a* is an example key or access card entry system.
Figure 3B:
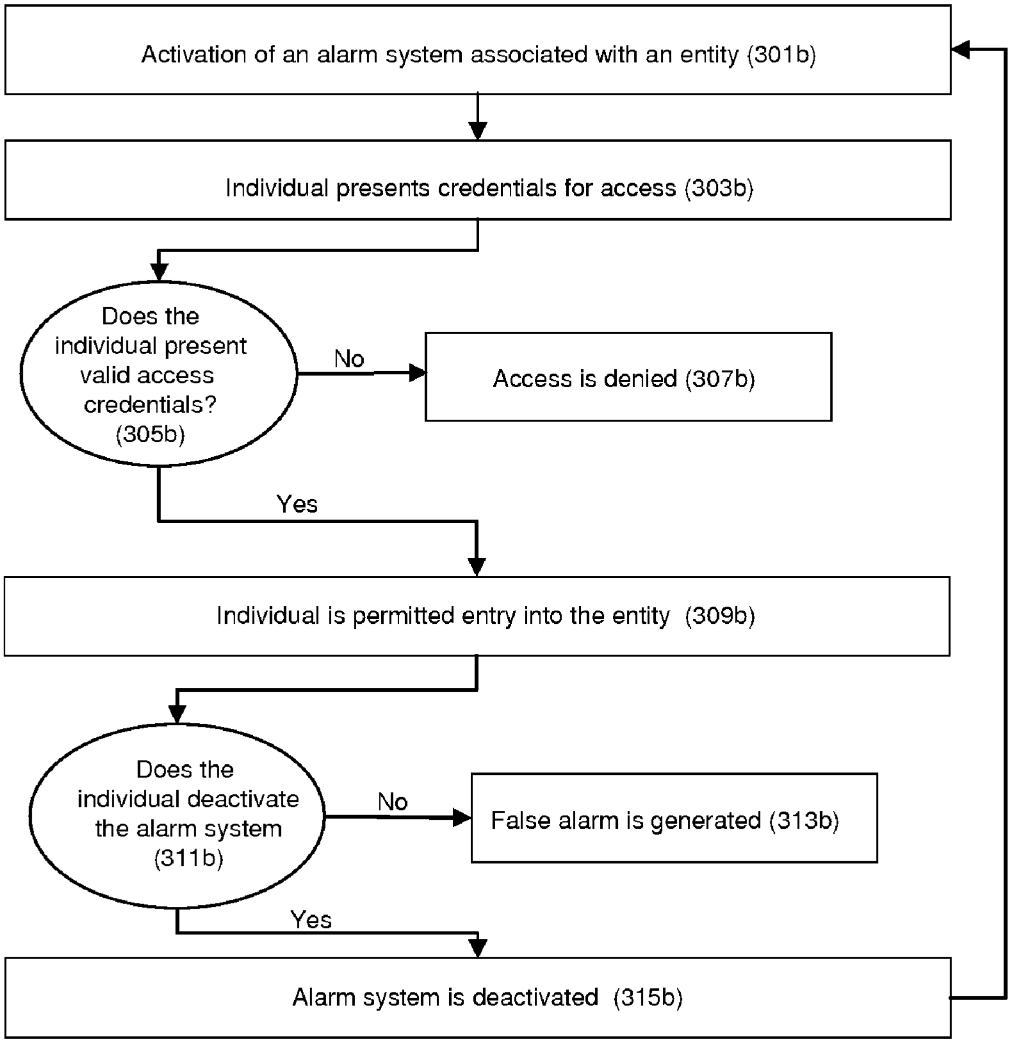
FIGURE 3B (PRIOR ART)
FIG. 3*b* is an example false alarm system.

Referring to FIG. 2, an illustrative system 200 for implementing methods according to the present disclosure is shown. As illustrated, system 200 may include one or more workstations 201. Workstations 201 may be local or remote, and are connected by one or more communications links 202 to computer network 203 that is linked via communications links 205 to server 204. In system 200, server 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

The steps that follow in the Figures may be implemented by one or more of the components in FIGS. 1 and 2 and/or other components, including other computing devices.

Figure 4:
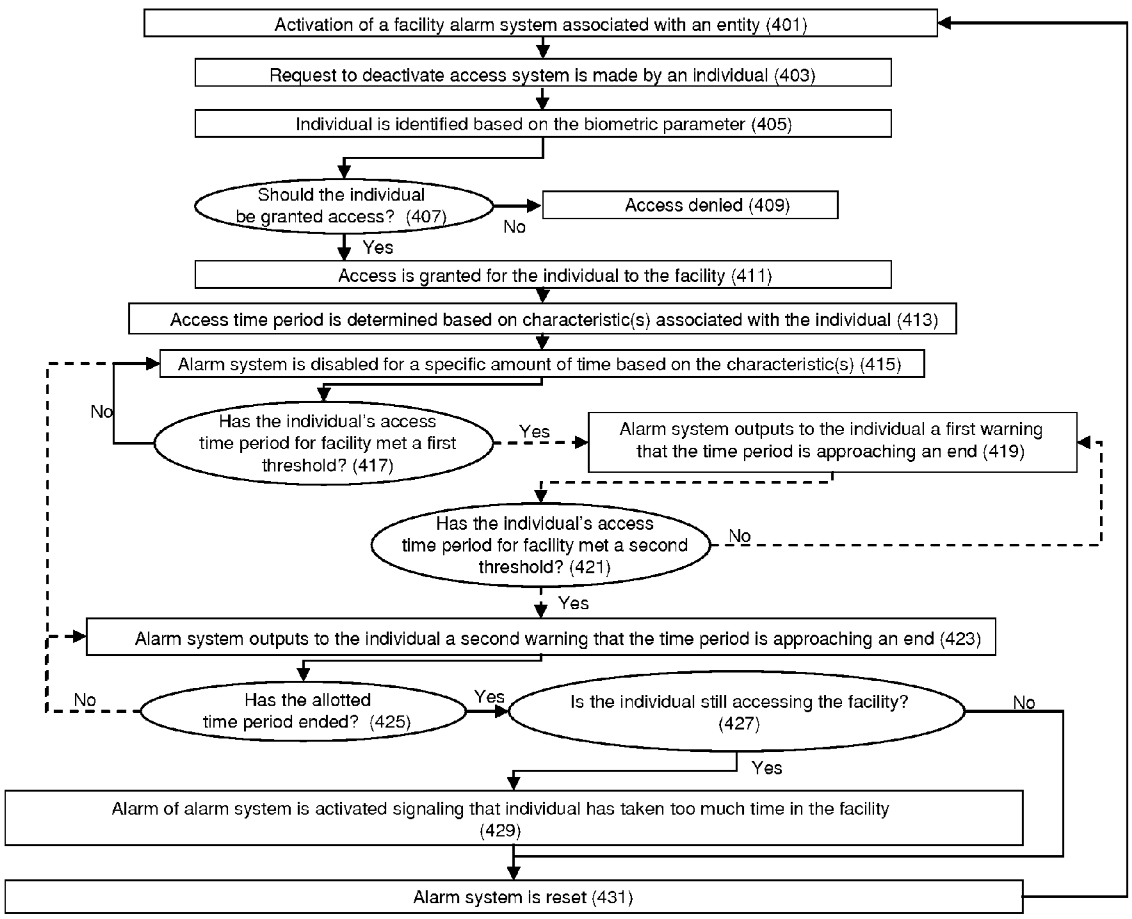
FIG. 4 is a flowchart of an illustrative method for facility access in accordance with at least one aspect of the present disclosure.

FIG. 4 is a flowchart of an illustrative method for facility access in accordance with at least one aspect of the present disclosure. In step 401, an alarm system associated with an entity may be activated. At step 403, a request to deactivate the alarm system may be made by an individual who seeks to gain access to the facility. For instance, an individual might have a key to open the front door of a facility or she may swipe her access card through a card reader. Alternatively, a biometric scanner such as an iris detector may be employed. The individual may then be identified based on a biometric parameter in step 405. Then the process may move to decision step 407 where a decision may be made as to whether the individual should be granted access based on the identification parameter. If the individual does not possess adequate credentials to be authorized entry, access may be denied to the individual in step 409.

In step 411, if proper credentials are presented, the system may grant access to the individual to the facility. Then, in step 413, an access time period may be determined based on one or more characteristics associated with the identified individual. Characteristics may be stored in a memory such as the one described in FIG. 1. For instance, an example characteristic of an individual may be her functional role at the entity. A functional role of the individual is a classification of the individual based on why she needs to have access to the facility. For instance, a cleaner may need access to all areas where she needs to provide custodial work; alternately, a courier may only need access to a front desk. A person's functional role does not have to be a formal job classification, but it may only convey the type of activity that the individual will need to conduct at the entity. Once an appropriate access time period is determined, the process may proceed to step 415 where the alarm system may be disabled for the identified individual for the appropriate access time.

As an example, it may be expected that a cleaner associated with a coffee shop might take a first measurable amount of time to complete a cleaning job within the entity. In comparison, a courier delivering mail to the same entity may not be expected to take nearly as long to make the deliveries. Therefore, their functional roles (cleaner versus courier) may be associated with very different time allotments for access authorization. The specific amount of time allowed per individual may be set manually or automatically based on computer readable instructions. In addition, the access times for different functional roles may be initially determined based upon historical data associated with one or more other individuals in the same functional role. For example, the access time for the system to set for a cleaner may be based upon a time that the cleaning service company guarantees work to be complete under, may be based upon historical data associated with other cleaners, and/or may be based upon desired times of the entity for completing of the work.

Other characteristics that could be used in setting the time period for access authorization of a facility may include a particular branch/office of the entity being accessed by the individual, a time of day and/or day of week that the individual is seeking access, a security clearance level of the individual, and/or any number of other features. The measure of how much time an individual is allotted access also may depend on a weighted summation of multiple characteristics. A weighted summation of multiple characteristics is essentially employed in a situation where two or more characteristics are useful in determining the time period that should be allotted to the individual. For instance, in the case of a cleaner needing facility access, both her functional role (cleaner) and the day of the week may be utilized in determining what kind of cleaning activities she will be required to perform. Then the time period for access may start at some baseline amount based on the fact that she is a cleaner and may be adjusted by a "weight" based on which day of the week it is. As an example, the system may assign a half hour to a cleaner to finish her job. But, upon realizing that Fridays require extra duties such as vacuuming the floor, the system may add fifteen minutes to her allotted time period. This weighted summation may be computed by the apparatus described in FIGS. 1 and 2.

Going back to FIG. 4, the process may move to step 417 where a decision may be made as to whether the individual's access time period is approaching an expiration point, e.g., at a first threshold. If the individual's access time period is approaching this first threshold, a warning may be announced to the individual that the time has reached the first threshold at step 419. The process may then reach step 421 where a decision may be made as to whether the individual's access time period for the facility has met a second threshold. If the individual's access time period is approaching this second threshold, then a second warning may also be given at step 423. This announcement may be in many forms. In one particular example, an announcement may be made over an intercom system of the facility. Other forms of announcements may include a text message sent to the individual or an optical cue such as the facility lights flashing. Still, any of a number of other types of announcements may be implemented to gain the attention of the individual still within the facility. The period of time between the warning and the end of the individual's allotted access time may vary and/or may be programmed into the system arbitrarily. Moreover, the warning may be output either continuously or just once after the thresholds have been met. Alternately, in other examples, no warning may be given to the individual. The lack of a requirement to include a warning is shown in FIG. 4 by the method proceeding from step 415 directly to step 425.

The process may then move to step 425, where a decision may be made as to whether the allotted time period for the individual has elapsed. If the time period has elapsed, the system may check to see if the individual is still within the facility in step 427. If the individual has left the facility, the alarm system may move to step 431, where it may be reset before moving back to step 401. If the individual has not left the facility in step 427, the process may then move to step 429 where an alarm of the alarm system may be activated signaling that the individual has taken too much time and appropriate action may be taken. This action may include, but is not necessarily limited to, notifying authorities or locking all entrance/exit points. Once the matter has been resolved, the alarm may be reset in step 431, and the process may return to step 401 for the next request for entry. It should be noted that a second individual seeking access authorization for the facility may be allowed access upon the presentation of proper credentials for a specific amount of time based on at least one characteristic associated with the second individual. This request for access authorization to the entity may be made at any time before, during, or after the request made by a first individual. These requests may be made either during or outside of business hours for the entity.

For example, assume that both a courier and a cleaner have been granted access to a coffee shop at the same time. The cleaner has been given access for 12 minutes, and the courier has been granted access for 10 minutes. Assume also that the first threshold for the cleaner and courier occurs five minutes before the expiration of their time periods, and a second threshold occurs two minutes prior to expiration. It should be noted that the warning threshold times do not have to be identical for each individual. After 5 minutes of access time, a first warning in the form of flickering overhead lights cues the courier that her access period is coming to an end. After 7 minutes of access time, a first warning in the form of a text message to the cleaner's cell phone cues her that her time period is coming to an end. Then, after 8 minutes of access time, a second warning may be issued to the courier in the form of a facility intercom system announcement telling her that her time period is coming to an end. Finally, after 10 minutes of access time, if the courier is still accessing the facility, an alarm of the alarm system may activate, signaling that the courier has taken too much time. Alternately, if the courier has left the facility, the facility alarm system is reset and activated for the next request for entry. In addition, at this same time, a second warning may be issued to the cleaner in the form of a call on her cell phone indicating that her time period is approaching an end. After 12 minutes of access time, if the cleaner is still accessing the facility, an alarm of the alarm system may activate, signaling that the cleaner has taken too much time. Alternately, if the cleaner has left, the facility alarm system is reset and activated for the next request for entry. In this way, the integrated alarm system can accommodate access and warnings for multiple people within the facility.

Figure 5:
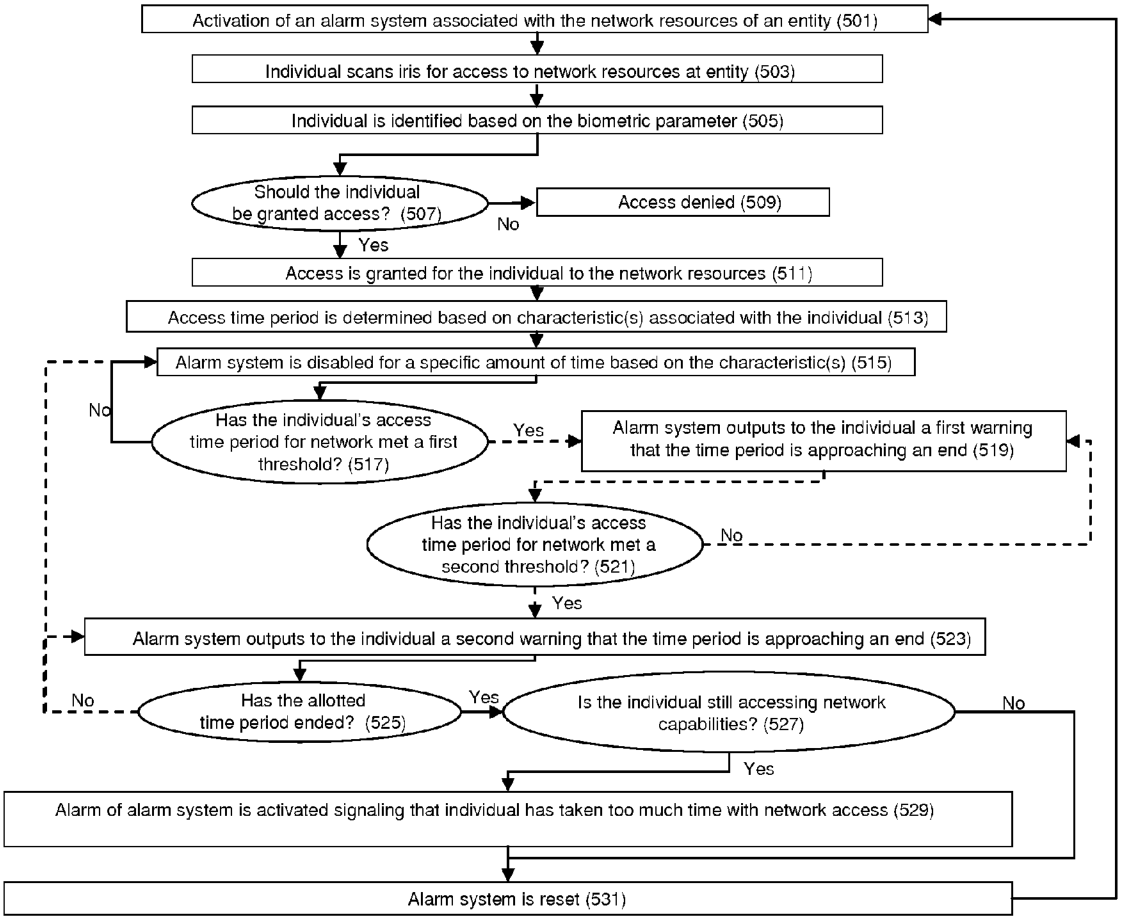
FIG. 5 is a flowchart of an illustrative method for network access in accordance with at least one aspect of the present disclosure.

FIG. 5 is a flowchart in accordance with another embodiment of the present disclosure. In this particular case, at step 501, access to the networking resources (computing and other capabilities) may be initially protected by an alarm system requiring the presentation of proper access authorization credentials. At step 503, the individual may request the deactivation of security measures for access to these computing facilities by having her iris scanned for authentication. It should be noted that the credential may include many other forms, including the aforementioned access cards or keys. Once the iris is scanned, the system and method may identify the individual based on a biometric parameter in step 505. The process may then move to step 507, where a decision may be made as to whether the individual should be granted access to the network resources.

If proper access authorization credentials are not presented, the individual may be denied access in step 509. If valid credentials are presented, the individual may be granted access to the network resources in step 511, and the access time period may be determined based on one or more characteristics associated with the individual in step 513. Once an appropriate access time period is determined, the process may proceed to step 515 where the alarm system may be disabled for the identified individual for the appropriate access time.

Then the process may reach step 517 where a decision is made as to whether the individual's access time period for the network has met a first threshold. If the individual's time period is approaching an expiration point (e.g., at a first threshold), a warning may be announced to the individual that the time has reached the first threshold at step 519. The system may then reach a step 521 where the system may decide if the individual's access time period for the network resources has met a second threshold. If the individual's access time period is approaching this second threshold, then a second warning may also be given at step 523. This announcement may be in many forms. In one particular example, an announcement may be made over the intercom system of the facility. Other forms of announcements may include a text message sent to the individual or an optical cue such as the facility lights flashing. Still, any number of other types of announcements may be implemented to gain the attention of the individual accessing network facilities. The period of time between the warning and the end of the individual's allotted access time may be programmed into the system arbitrarily. Moreover, the warning may be output either continuously or just once after the thresholds have been met. Alternately, in other examples, no warning may be given to the individual. The lack of a requirement to include a warning is shown in FIG. 5 by the method proceeding from step 515 directly to step 525.

The process may then move to step 525, where a decision is made as to whether the allotted time period for the individual has elapsed. If the time period has elapsed, the system may check to see if the individual is still accessing network resources in step 527. If the individual is not accessing them, the alarm system may move to step 531 where the alarm system is reset and then return to step 501 to wait for the next request for network access. If the individual is still accessing the network resources in step 527, the process may move to step 529 where an alarm of the alarm system may be activated, signaling that the individual has taken too much time and appropriate action may be taken. This action may include, but is not necessarily limited to, notifying authorities or locking all entrance/exit points. Once the matter has been resolved, the alarm may be reset in step 531 and the process may return to step 501. It should be noted that a second individual seeking access authorization for a network resource may be allowed access upon the presentation of proper credentials for a specific amount of time based on at least one characteristic associated with the second individual. This request for access authorization to the entity may be made at any time before, during, or after the request made by a first individual. Alternately, there could be multiple access stations that are associated with each network resource. These requests may be made either during or outside of business hours for the entity.

Figure 6:
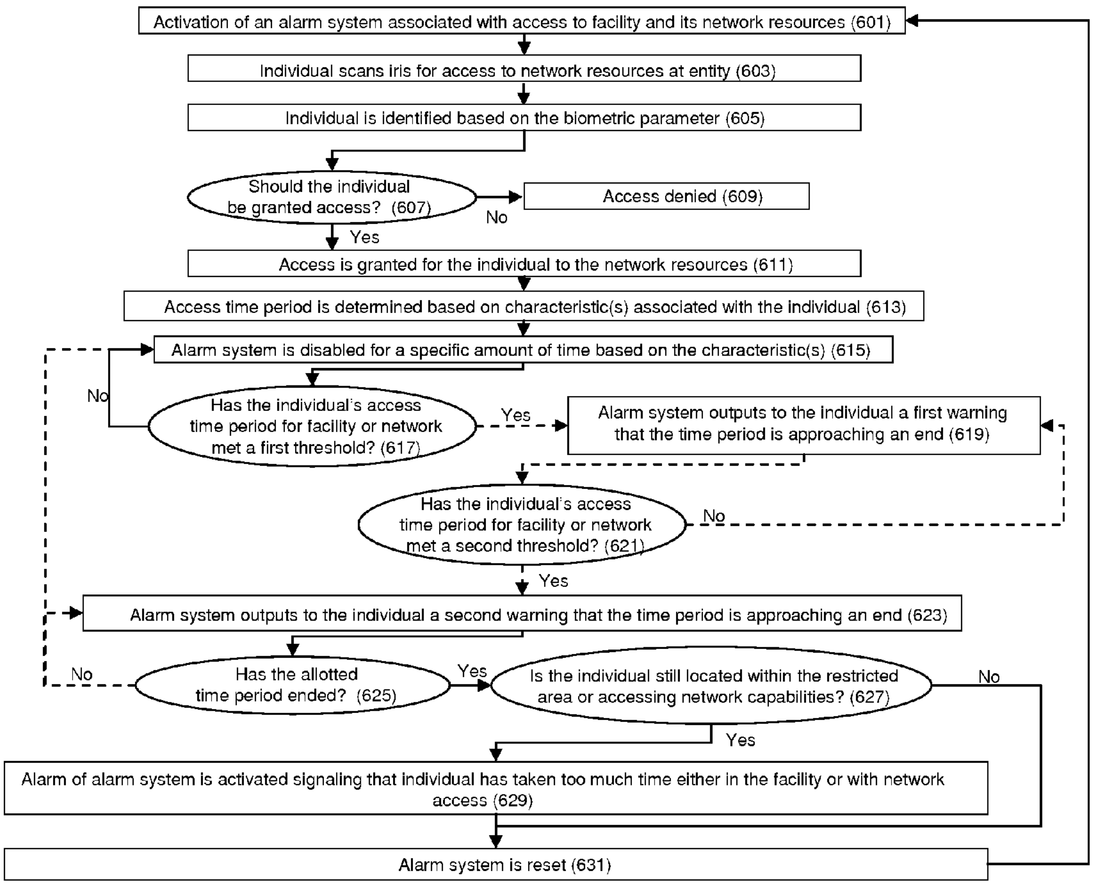
FIG. 6 is a flowchart of an illustrative method for integrating facility access, network access, and alarm systems in accordance with at least one aspect of the present disclosure.

FIG. 6 shows yet another embodiment of the system where facility access for a particular time period is integrated with access to the networking resources associated with the entity.

In this particular case, at step 601, an alarm system associated with access to a facility and its networking resources (computing and other capabilities) may be initially activated. At step 603, the individual may request the deactivation of security measures for access to the facility and to allow use of its computing facilities by having her iris scanned for authentication. It should be noted that the credential can include many other forms, including the aforementioned access cards or keys. Once the iris has been scanned, the system and method may identify the individual based on a biometric parameter at step 605. Then the process may move to decision step 607 where a decision is made as to whether the individual should be granted access based on the identification parameter. If the individual does not possess adequate credentials to be authorized entry, access may be denied to the individual in step 609.

In step 611, if valid credentials are presented, the individual may be granted access to the facility and use of its network resources. Then, in step 613, an access time period may be determined based on one or more characteristics associated with the individual. Once an appropriate access time period is determined, the process may proceed to step 615 where the alarm system may be disabled for the identified individual for the appropriate access time. It should be noted that the individual may possess proper credentials for entry into the facility but may not possess adequate credentials for access to network resources. The system may be capable of determining this distinction and allowing access to the facility but not to the use of any network resources.

The process may then reach step 617 where a decision may be made as to whether the individual's access time period to the facility and use of its network resources is approaching an expiration point, e.g., at a first threshold. If the individual's access time period is approaching this first threshold, a warning may be announced to the individual that the time has reached the first threshold at step 619. The process then may reach step 621 where a decision may be made if the individual's access time period for the facility and use of its network resources has met a second threshold. If the individual's access time period is approaching this second threshold, then a second warning may also be given at step 623. This announcement may be in many forms. In one particular example, an announcement may be over an intercom system of the facility. Other forms of announcements may include a text message sent to the individual or an optical cue such as the facility lights flashing. Still, any of a number of other types of announcements may be implemented to gain the attention of the individual still within the facility. The period of time between the warning and the end of the individual's allotted access time may vary and/or may be programmed into the system arbitrarily. Moreover, the warning may be output either continuously or just once after the thresholds have been met. Alternately, in other examples, no warning may be given to the individual. The lack of a requirement to include a warning is shown in FIG. 6 by the method proceeding from step 615 directly to step 625.

The process then may move to step 625, where a decision may be made as to whether the allotted time period either for facility access or use of its network resources for the individual has expired. If the time period has elapsed, the process may check to see if the individual is still accessing the facility or using its network resources in step 627. If the individual is neither accessing the facility nor using its network resources in step 627, the process then may move to step 631 where the alarm system is reset. Afterwards, the process may move back to step 601 where the alarm system may be reactivated and waits for the next access request. Alternately, if the individual has exceeded her time period for either accessing the facility or using its network resources, an alarm of the alarm system may be activated signaling that the individual has taken too much time and appropriate action may be taken in step 629. This action may include, but is not necessarily limited to, notifying authorities or locking all entrance/exit points. Once the matter has been resolved, the alarm may be reset in step 631 and the process may return to step 601. It should be noted that a second individual seeking access authorization for a network resource and/or to the facility may be allowed access upon the presentation of proper credentials for a specific amount of time based on at least one characteristic associated with the second individual. This request for access authorization to the entity may be made at any time before, during, or after the request made by a first individual. Alternately, there could be multiple access stations that are associated with each network resource. These requests may be made either during or outside of business hours for the entity.

It should be noted that the facility access and other security alarm systems associated with the entity are integrated together into one system in the embodiment shown in FIG. 6. Two embodiments of this integrated system that may store access information and individual characteristics are shown in FIGS. 1 and 2.

Going back to the example of a coffee shop, certain embodiments of the disclosure may allow the person to rest the alarm system when she needs more time. For instance, if the cleaner from the previous example realizes that her 12 minutes is coming to an end, but she has not finished vacuuming the floor, she may have the time for access increased. She may either request that her time be reset to its full amount or she may request a grace period, giving her enough time to complete her task. This increase in time may happen either with or without a re-identification process based on a biometric parameter (e.g., rescan of iris).

If the individual is intending to leave within the allotted time period but is unable to do so as a result of unforeseen delays, the system may determine that the individual needs more time. For instance, if a courier is delayed due to the fact that she needs to wait for the signature of someone not currently at her desk, the system may use a monitoring device such as a video camera appropriately positioned to realize that the courier is being delayed for legitimate reasons. In such an event, the system may again either reset the time allotted to the individual or she may be given a grace period based on the nature of the delay.

Figure 7:
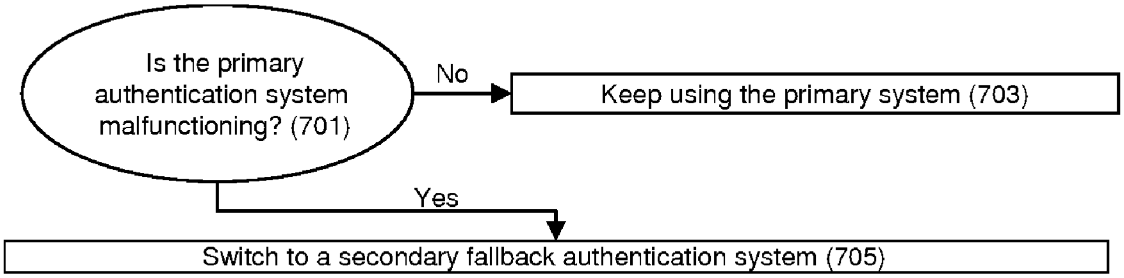
FIG. 7 is a flowchart of an illustrative method for having a fallback access authentication system in case the primary system fails in accordance with at least one aspect of the present disclosure.

FIG. 7 shows another embodiment of the system where a fallback access authentication system may be used if the primary system fails, is malfunctioning, and/or is not operating in a desired manner. In step 701, a decision may be made as to whether the system is properly functioning. A malfunction may be caused by a host of reasons, including power failure, a lens aberration, too much light received at a scanning device, and/or other conditions. If the system is properly functioning, nothing different may be done from what is done in FIGS. 4, 5, and 6, and the primary system may still be used in step 703. If a malfunction is detected within the primary authentication system, a secondary system such as the presentation of an access card or key may be used in step 705. In this way, the entire system may be more robust.

While illustrative systems and methods as described herein embodying various aspects of the present disclosure are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present disclosure. The description is thus to be regarded as illustrative instead of restrictive on the present invention.

What is claimed is:

1. A method comprising:

identifying an individual seeking access to a restricted area;

determining whether the identified individual is authorized to access the restricted area;

when authorized, permitting entry of the identified individual into the restricted area;

determining a time period of a plurality of time periods to disable an alarm system of the restricted area based on at least one characteristic stored in a memory and associated with the identified individual; and disabling the alarm system for the time period, wherein the at least one characteristic of the identified individual is a functional role of the identified individual, wherein the determining the time period is based upon historical data associated with at least one other individual in the same functional role.

2. The method of claim 1, wherein the determining of whether the identified individual is authorized to access the restricted area is done with a fallback authentication method when the primary method is malfunctioning.

3. The method of claim 1, further comprising activating the alarm system.

4. The method of claim 1, further comprising determining whether the individual is attempting to access the restricted area.

5. The method of claim 1, wherein the identifying of the individual seeking access is based on a biometric parameter of the individual.

6. The method of claim 1, further comprising determining whether expiration of the time period is within a first threshold.

7. The method of claim 6, further comprising upon determining expiration of the time period is within the first threshold, providing a warning to the identified individual.

8. The method of claim 7, wherein the warning is an audible announcement.

9. The method of claim 7, wherein the warning is an optical cue.

10. The method of claim 7, wherein the warning is a text message.

11. The method of claim 6, further comprising when within a second threshold, providing a second warning to the identified individual.

12. The method of claim 1, further comprising determining whether the identified individual is in the restricted area after expiration of said time period.

13. The method of claim 12, further comprising upon said identified individual is in the restricted area after expiration of the time period, activating an alarm of the alarm system.

14. The method of claim 1, further comprising resetting the alarm system.

15. The method of claim 1, wherein the at least one characteristic of the identified individual includes a security clearance level of the identified individual.

16. The method of claim 15, wherein the at least one characteristic of the identified individual includes the restricted area for which access is sought.

17. The method of claim 15, wherein the at least one characteristic of the identified individual is a day of week or time of day for which entry is sought.

18. The method of claim 15, wherein the at least one characteristic is a weighted average of multiple characteristics.

19. An apparatus comprising:

a processor;

a memory having stored therein computer executable instructions, that when executed by the processor, cause the apparatus to perform:

identifying an individual seeking access to a restricted area;

determining whether the identified individual is authorized to access the restricted area;

when authorized, permitting entry of the identified individual into the restricted area;

determining a time period of a plurality of time periods to disable an alarm system of the restricted area based on at least one characteristic stored in a memory and associated with the identified individual; and disabling the alarm system for the time period, wherein the at least one characteristic of the identified individual is a functional role of the identified individual, wherein the determining the time period is based upon historical data associated with at least one other individual in the same functional role.

20. The apparatus of claim 19, wherein the identifying of the individual seeking access is based on a biometric parameter of the individual.

21. The apparatus of claim 19, wherein the method further performs determining whether the individual is attempting to access the restricted area.

22. A method comprising:

identifying an individual seeking access to a restricted area;

determining whether the identified individual is authorized to access the restricted area;

when authorized, permitting entry of the identified individual into the restricted area;

allowing access to network resources associated with the restricted area;

determining a time period of a plurality of time periods to disable an alarm system of the restricted area and to allow use of network facilities within the restricted area based on at least one characteristic stored in a memory and associated with the identified individual; and disabling the alarm system for the time period, wherein the at least one characteristic of the identified individual is a functional role of the identified individual, wherein the determining the time period is based upon historical data associated with at least one other individual in the same functional role.

23. The method of claim 22, wherein the identified individual is permitted entry into the restricted area but not allowed access to the network resources when the at least one characteristic is not valid for the individual.

24. The method of claim 22, wherein the identifying the individual seeking access is based on a biometric parameter of the individual.

25. An apparatus comprising:

a processor;

a memory having stored therein computer executable instructions, that when executed by the processor, cause the apparatus to perform:

identifying an individual seeking access to a restricted area;

determining whether the identified individual is authorized to access the restricted area;

when authorized, permitting entry of the identified individual into the restricted area;

allowing access to network resources associated with the restricted area;

determining a time period of a plurality of time periods to disable an alarm system of the restricted area and to allow use of network facilities within the restricted area based on at least one characteristic stored in a memory and associated with the identified individual; and disabling the alarm system for the time period, wherein the at least one characteristic of the identified individual is a functional role of the identified individual, wherein the determining the time period is based upon historical data associated with at least one other individual in the same functional role.

26. The apparatus of claim 25, wherein the identifying the individual seeking access is based on a biometric parameter of the individual.

27. The apparatus of claim 25, wherein the method further performs activating the alarm system.

28. The apparatus of claim 25, wherein the method further performs determining whether the individual is attempting to access the restricted area.

29. The apparatus of claim 25, wherein the method further performs determining whether expiration of the time period is within a first threshold.

30. The apparatus of claim 29, wherein the method further performs upon determining that the expiration of the time period is within the first threshold, providing a warning to the identified individual.

31. The apparatus of claim 30, wherein the warning is an audible announcement.

32. The apparatus of claim 30, wherein the warning is an optical cue.

33. The apparatus of claim 30, wherein warning is a text message.

34. The apparatus of claim 29, wherein the apparatus further performs when within a second threshold, providing a second warning to the identified individual.

35. The apparatus of claim 25, wherein the apparatus further performs determining whether the identified individual is in the restricted area after expiration of said time period.

36. The apparatus of claim 25, wherein the at least one characteristic used by the apparatus is a weighted average of multiple characteristics.

37. The apparatus of claim 25, wherein the determining of whether the identified individual is authorized to access the restricted area includes utilizing a secondary authentication system upon determining a primary system is not functioning properly.

38. The method of claim 1, wherein the identifying the individual seeking access includes identifying the specific individual seeking access.

* * * * *